though each pulldown is four sprocket holes high.

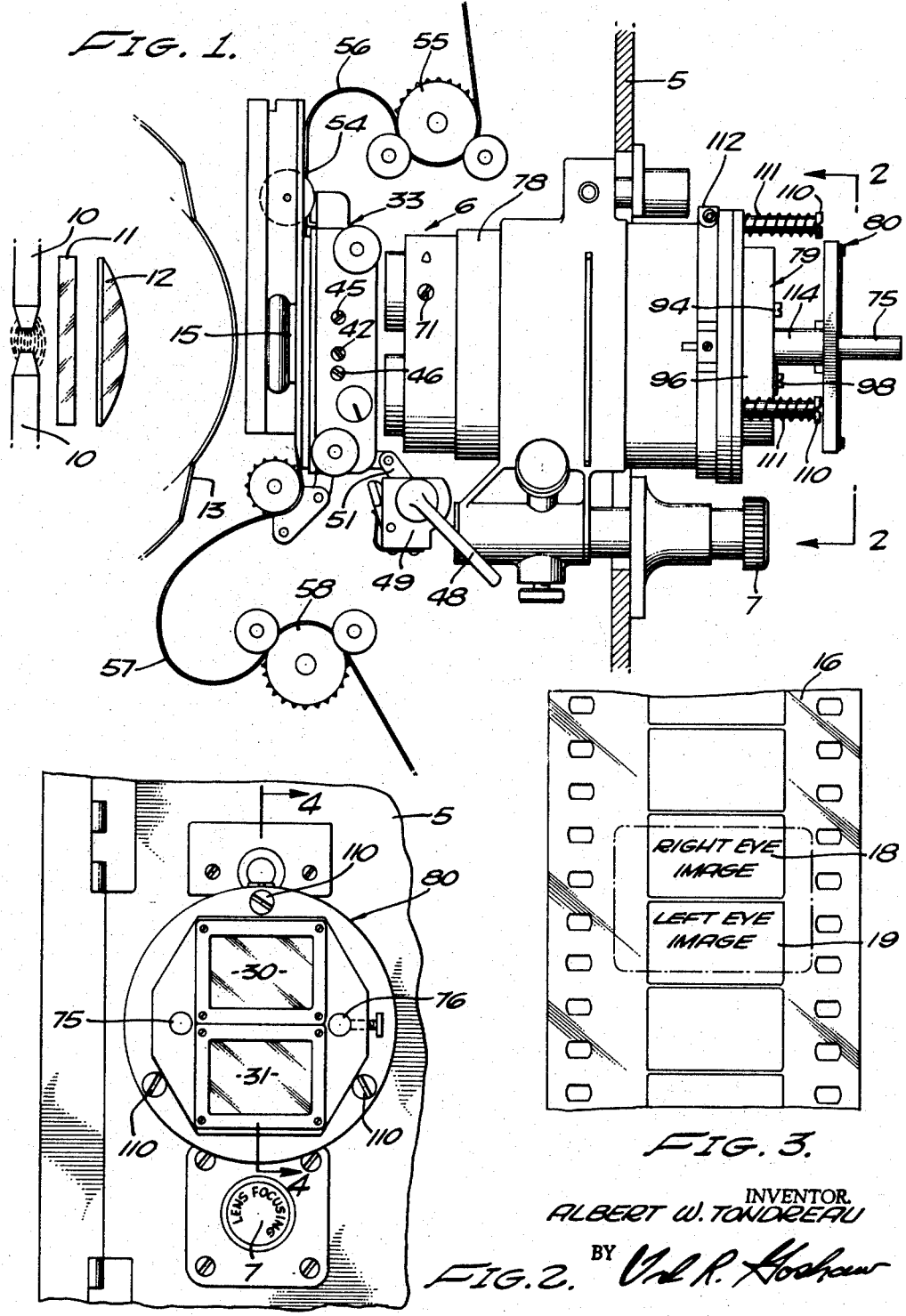

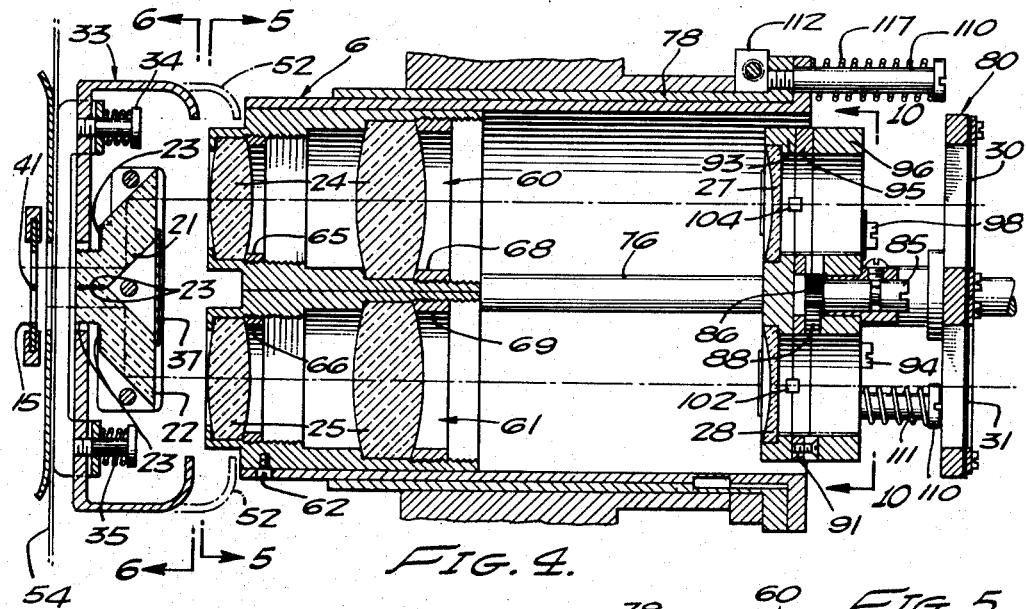
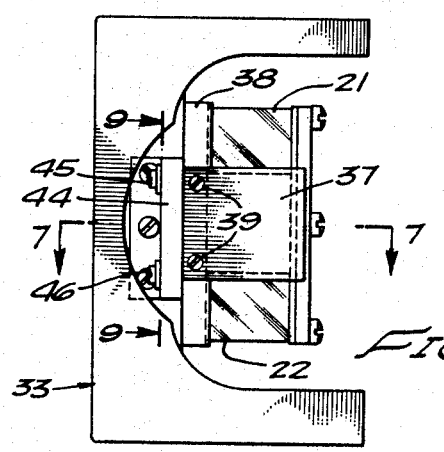
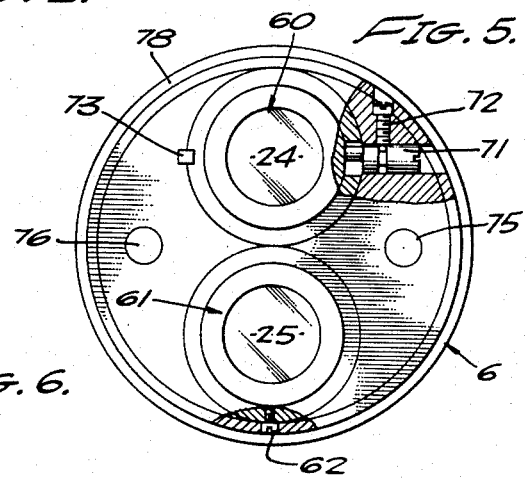
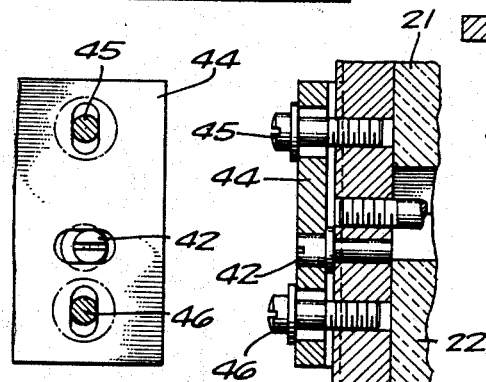

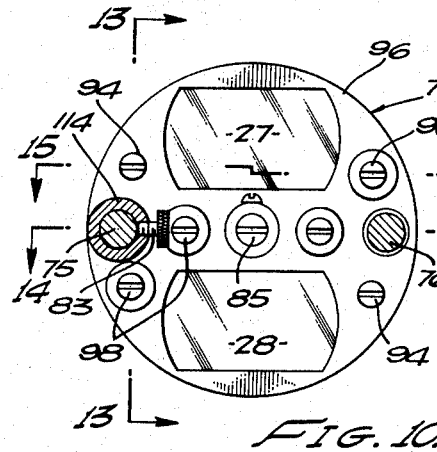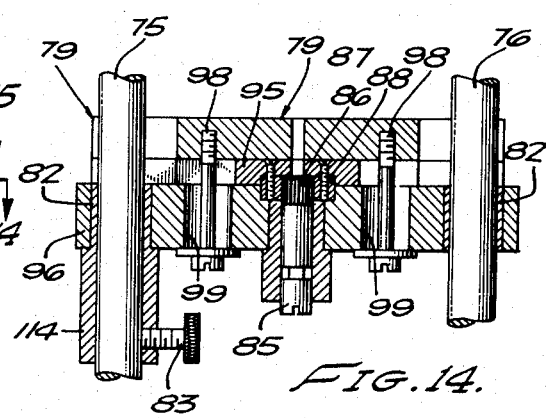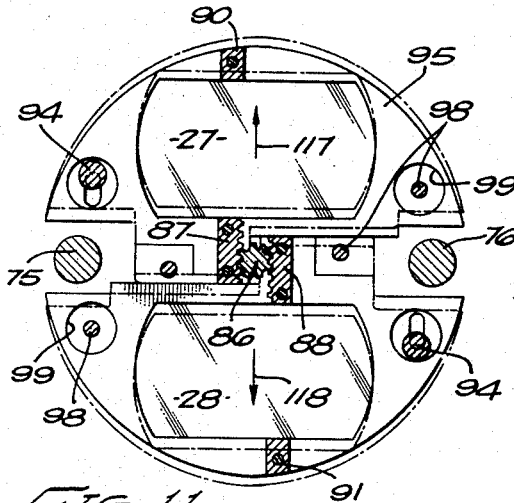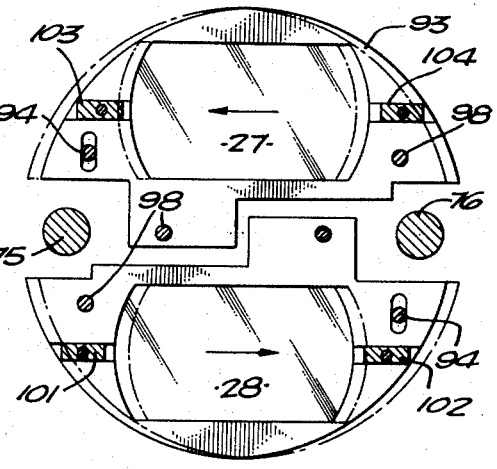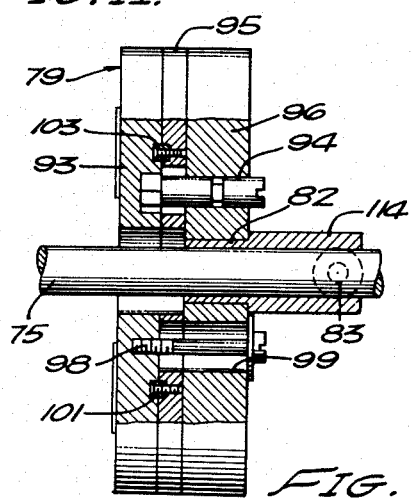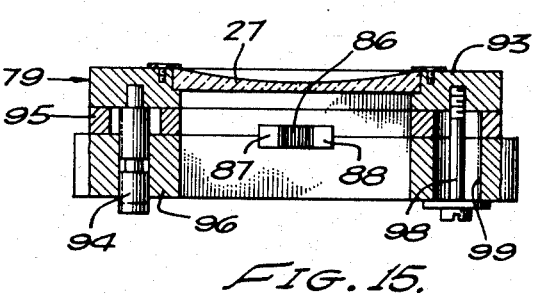

United States Patent Office 3,189,915
Patented June 15, 1965

3,189,915
SINGLE PROJECTOR STEREOSCOPIC SYSTEM
Albert W. Tondreau, Los Angeles, Calif., assignor to Warner Bros. Pictures, Inc., New York, N.Y., a corporation of Delaware
Filed Feb. 23, 1962, Ser. No. 175,077
15 Claims. (Cl. 352—60)

This invention relates to stereoscopic projection systems, and particularly to such a system using a single projector and a novel optical unit of high efficiency and definition.

Motion picture stereoscopic systems are well known, most of which systems utilize two projectors, one projecting right eye images and the other projecting left eye images of a scene. The images are projected through separating polarizing filters for super-imposing on a specular reflecting screen. Some systems use different colors instead of polarizing filters. The super-imposing of the images on the screen is simply accomplished by directing each projector at the same area of the screen, the observer wearing polarizing or color devices, such as spectacles, for separating the images for impressing each eye with the proper series of views.

There have been some stereoscopic systems which have used a single projector in which rotated projection lenses converged the images to obtain the necessary super-imposing thereof on the screens. In such systems, spherical and color aberrations were present and sharp definition of the images over the entire image area was not obtained.

The present invention is a stereoscopic system which utilizes a single projector and a single film, the film having serially-arranged alternate right and left hand images which have been altered in size to occupy the full height of a four-sprocket hole pulldown frame, each pulldown of the film positioning two images in the split aperture for simultaneous projection to the screen. The present invention has overcome many of the prior disadvantages of single projector stereoscopic systems my maintaining parallelism of the images through the projection lenses, then utilizing negative or diverging spherical lenses which are adjustable axially with respect to one another and transversely of the projection lens image beams. In this manner, not only is the desired amount of enlargement obtained but it is obtained with sharp definition of the super-imposed images on the screen without substantially shifting the central light ray of the images.

Another feature of the invention is the special construction of the separating prisms to prevent back light from entering the projection aperture. A further feature of the invention is that it is quickly attachable to any standard motion picture projector without any major alteration to the standard projector.

The principal object of the invention, therefore, is to facilitate the projection of stereoscopic images.

Another object of the invention is to provide an improved stereoscopic motion picture projection system using a single projector and a single film.

A still further object of the invention is to provide a replacement of certain elements of a standard motion picture projector which will project stereoscopic pictures with the minimum of distortion and aberrations and with maximum definition of the images.

A better understanding of this invention may be had from the following description when read in connection with the accompanying drawings, in which:

FIG. 1 is an elevational side view of a projection system embodying the invention;

FIG. 2 is a front view of the projection system shown in FIG. 1 and taken along the line 2—2 of FIG. 1;

FIG. 3 is a detail view of the images as they appear on 35 mm. motion picture film and on which has been imposed a normal motion picture image for comparison;

FIG. 4 is a cross-sectional view of the projection system taken along the line 4—4 of FIG. 2;

FIG. 5 is a view of the projeciton lenses taken along the line 5—5 of FIG. 4;

FIG. 6 is a view of the prism assembly taken along the line 6—6 of FIG. 4;

FIG. 7 is a cross-sectional view taken along the line 7—7 of FIG. 6;

FIG. 8 is a detail cross-sectional view taken along the line 8—8 of FIG. 7;

FIG. 9 is a detail view of the prism mounting bracket taken along the line 9—9 of FIG. 6;

FIG. 10 is an end view of the negative lens assembly taken along the line 10—10 of FIG. 4;

FIG. 11 is an end view of the negative lens assembly showing the adjusting mechanism for the lenses;

FIG. 12 is a similar view to FIG. 11 showing the mechanism for adjusting the lenses in a transverse direction;

FIG. 13 is a detail cross-sectional view of the adjusting mechanism for the negative lenses taken along the line 13—13 of FIG. 10;

FIG. 14 is a detail cross-sectional view of the adjusting mechanism taken along the line 14—14 of FIG. 10; and FIG. 15 is a detail cross-sectional view of a negative lens mounting frame taken along the line 15—15 of FIG. 10.

Referring, now, to the drawings in which the same reference numerals identify the same elements, a front plate 5 of a standard motion picture projector supports the projection lens assembly shown generally at 6, the usual lens focusing adjustment screw being shown at 7. Starting from the left-hand side of FIG. 1, a pair of carbons 10 provide the light which is projected through a heat filter 11, a condenser lens 12, and past a shutter 13. The optical path includes an aperture plate 15 which is in two sections, each section including one of the images shown on the film 16 in FIG. 3. That is, the aperture plate is the height of two images, the width of an image, and has a center divider of the width of the spacing between the images. Two of the images from the film 16, such as images 18 and 19, are simultaneously projected to the entrance faces of prisms 21 and 22, respectively (see FIG. 4), the images being separated by double reflection for impression on two series of image projection lenses 24 and 25. The outer faces 23 of the prisms 21 and 22 are serrated and blackened in any suitable manner to prevent light from being reflected back to the film.

The image light beams are then projected to a pair of negative or diverging spherical lenses 27 and 28, the light beams then passing through light polarizing filters 30 and 31, respectively.

The image beams through the projection lenses 24 and 25 are parallel but are super-imposed on an observation medium, such as a specular reflecting screen, by the adjustment of the negative lenses 27 and 28. By the use of planar concave lenses 27 and 28 with their concave faces toward the film and with only axial and transverse adjustments thereof to maintain their planar exit faces normal to the parallel beams from the projection lenses, the super-imposed images will be sharp with the minimum of color and spherical aberrations. Thus, for a stereoscopic optical system for a standard projector and a single film such as shown in FIG. 3, it is only necessary to provide the split aperture 15, the beam separating unit 21–22, the projection lens unit 6, including the negative lenses, and the filter unit 30–31, the unit 6 having the necessary adjustments therein to accommodate the length of throw in any particular theater or observation area.

The mountings of the optics and the adjustment features will now be described: First, the split mask 15 as above described is simply placed in position by substituting it for the regular 35 mm. aperture. The usual pressure plate is then removed and the pressure plate shown generally at 33 is substituted, this pressure plate having the usual spring-mounted screws 34 and 35. The prism assembly shown in FIG. 6 is mounted on the pressure gate. This assembly has a mask 37 looking toward the film which is mounted on the bracket 38 by screws 39. To obtain a vertical adjustment of the two prisms so that the center thereof is in line with divider 41 of the split aperture plate 15, a cam pin 42 may be rotated. (See FIGS. 8 and 9.) Since the angle bracket 44 is fixed and the screws 45 and 46 are in elongated slots in the bracket 44, it is only necessary to loosen the screws 45 and 46 and turn the cam pin 42 to raise and lower the prisms. Thus, coincidence of the center of the prisms with the spacer 41 of the aperture plate is obtainable.

The pressure pad and prism assembly may be moved to the right, as seen in FIGS. 1 and 4, by a lever 48 mounted on a frame 49, the lever 48 being attached to the pressure pad by a linkage 51. This movement is indicated by the dot-and-dash lines 52 in FIG. 4. This permits the threading of the film 54 past the aperture, the film passing around a sprocket 55 to a loop 56, and then from the loop 57 to a sprocket 58, each sprocket having the usual pad rollers.

The adjustment of the projection lens assembly for lenses 24 and 25 is accomplished in a longitudinal or axial direction by making the upper lens assembly 60 adjustable with respect to the lower lens assembly 61, the lower lens assembly being locked to the lens barrel by a screw 62. The projection lenses to the left in FIG. 4 are held in position by respective threaded rings 65 and 66, while the projection lenses to the right are held in position by threaded rings 68 and 69.

As shown in FIG. 5, the upper lens assembly may be moved axially with respect to the lower lens assembly by rotation of a cam pin 71 which may be then locked in position by a set screw 72, the lens assembly being guided by a key 73. Thus, to make the two projection lens assemblies 24–25 correspond in focus, the upper lens unit is adjustable as just described.

As shown clearly in FIG. 14, two mounting rods 75 and 76 support the negative lens assembly 79, and the filter assembly 80, the rods being anchored in the projection lens mount 6, the mount 6 being held within the barrel 78 which is clamped to the projector frame. Studs 110 surrounded by springs 111 bias the projection lens assembly 6 to a predetermined axial position determined by a collar 112 surrounding the barrel 78. These springs permit the lens system 6 to be moved to the right when the pressure plate 33 moves the lens system to the right during threading of the film.

As shown in FIG. 14, bushings 82 surround the mounting rods 75 and 76, an extension 114 being provided on rod 75 with a set screw 83 for locking the negative lens assembly 79 to its mounting rods 75 and 76 in position when the desired image size is obtained.

To obtain exact super-imposing of the images, such as 18 and 19 in FIG. 3, the negative lenses 27 and 28 are adjustable to and from one another as shown in FIG. 11, and transversely with respect to one another, as shown in FIG. 12. To accomplish the vertical adjustment, as shown by arrows 117 and 118, a slotted rotatable shaft 85 has a pinion 86 thereon which is in mesh with a rack 87 for lens 27, and a rack 88 for the lens 28. Thus, a clockwise rotation of the shaft 85 will separate the lenses 27 and 28 in a vertical direction and rotation in the opposite direction will bring the lenses closer together. In this manner, vertical coincidence of the images is obtained. During this adjustment, the movement of lens 27 is maintained in position by a guide 90, while lens 28 is guided by a guide 91.

Referring, now, to FIG. 15, the lens 27 is shown in its lens mount 93, which is mounted on a lateral eccentric pin 94, the intermediate plate 95 being positioned between the lens mount 93 and the lens frame 96. The assembly screws 98 are mounted in over-sized holes, such as 99, to permit the lateral adjustments of the lens mount by rotation of the eccentric screw 94. The lower lens 28 is horizontally adjustable laterally in the same manner, the lower lens being guided by guides 101 and 102, the upper lens being guided by guides 103 and 104.

The above-described stereoscopic projection system, therefore, provides a parallel optical system which introduces the minimum of color and spherical aberration or distortion, and provides sharply defined images superimposed on the screen. By the use of polarizing filters and spectacles, the observers see more perfect stereoscopic pictures with the use of only a single projector and a single film.

I claim:

1. A stereoscopic projection system for a single film having alternate right and left hand images thereon and having substantially no color and spherical aberration comprising an aperture plate having a pair of apertures in which a pair of said images is positioned at any one time, a pair of image beam separating prisms, means for projecting light through said film onto the entrance faces of said prisms, said prisms separating said image beams and transmitting said beams in parallel paths, a pair of projection lens assemblies for projecting said images in parallel light beams, a pair of negative lenses having concave spherical entrance surfaces positioned toward said projection lens assemblies, said pair of light beams being projected on said concave surfaces, an observation medium, and a pair of polarizing units, said prisms, projection lens assemblies, negative lenses, and polarizing units being positioned in that order, said negative lenses being laterally adjustable perpendicularly to the optical axes of said light beams to super-impose said images on said observation medium while maintaining the central light rays of said light beams substantially parallel.

2. A system in accordance with claim 1 in which means are provided for adjusting the line of separation between said entrance faces of said prisms to coincide with the line of separation between said images, together with means for adjusting said negative lenses axially to vary the size of said images on said observation medium.

3. A system in accordance with claim 1 in which the outer edges of said prisms are serrated and blackened to prevent re-entering light from reacting said film.

4. A system in accordance with claim 1 in which means are provided for axially adjusting one of said projection lens assemblies with respect to the other when said assemblies are mismatched optically to sharply focus each of said images on said observation medium and provide greater tolerance between said assemblies.

5. A system in accordance with claim 4 in which means are provided for laterally adjusting said negative lenses toward and away from one another and perpendicularly to the optical axes of said light beams for obtaining coincidence of said images on said observation medium.

6. In a system for simultaneously projecting a pair of images arranged in serial order on a motion picture film for superimposing each pair of images on an observation medium with substantially no color or spherical aberration, the combination of an aperture plate for positioning an adjacent pair of said images, a double-reflecting pair of prism units following said aperture plate for separating light beams passing through said images into parallel beams, a pair of projection lens assemblies following said prism units, one for each light beam image, said assemblies projecting said image light in parallel beams, a pair of planar concave negative spherical lenses following said projection lens assemblies and having the planar surfaces facing said observation medium, and means following said negative spherical lenses for characterizing the light of each of said images with respect to one another as projected upon said observation medium, one of said projection assemblies being adjustable with respect to the other projection assembly and said negative spherical lenses being simultaneously adjustable with respect to one another.

7. A system in accordance with claim 6 in which said prism units are adjustable parallel with the plane of said film in said aperture plate to position the line of division between said units in line with the line of division between said images.

8. A system in accordance with claim 6 in which means are provided for axially adjusting one of said projection lens assembles with respect to the other projection lens assembly when said assemblies are mismatched optically to focus said images on said observation medium.

9. A system in accordance with claim 6 in which said negative lenses are adjustable transversely with respect to each other in the same plane and perpendicularly to the optical axes of said light beams to maintain their planar exit faces parallel to said observation medium and the central light rays of said beams substantially parallel.

10. A system in accordance with claim 6 in which the outer edges of said prism unit are serrated and blackened to prevent re-entering light from reaching said film.

11. In a substantially non-color and non-spherical aberration stereopscopic projection system for right and left hand images arranged in alternate series on a motion picture film, the combination of a source of light, means for projecting said light on an adjacent pair of said images on said film simultaneously, a pair of oppositely positioned double-reflecting prism units following said film for separating the light beams from each of said images into parallel beams, a pair of projection lens assemblies following said prism units for projecting the image light beams parallel to one another, an observation medium, a pair of planar-concave lens units following said projection lens assemblies and having their planar surfaces facing said observation medium for super-imposing said light beams on said observation medium, and means following said planar-concave lens units for characterizing the light in each of said beams as projected on said observation medium, one of said projection lens assemblies being fixed and the other lens assembly being axially adjustable and said planar-concave lens units being simultaneously adjustable with respect to one another.

12. A system in accordance with claim 11 in which one of said projection lens assemblies is adjustable axially with respect to the other when said assemblies are mismatched optically to provide coincidence of focus of said images on said observation medium.

13. A system in accordance with claim 11 in which means are provided for transversely adjusting said planar-concave lens units to and from one another in the same plane and perpendicularly to the axes of said light beams to maintain the planar surfaces of said negative lens units parallel with said observation medium and obtain superimposed coincidence of all portions of said images on said medium.

14. A system in accordance with claim 11 in which said prism units have the outer edges thereof serrated and blackened to prevent re-entering light from reaching said film.

15. A system in accordance with cliam 13 in which said transversely adjusting means includes a pair of racks and a pinion system, one of said racks being fixed to each lens unit, said pinion being in mesh with both of said racks to simultaneously move both of said lens units.

References Cited by the Examiner
UNITED STATES PATENTS

| | | | |
|---|---|---|---|
| 1,843,663 | 2/32 | Gregier | 88—1 |
| 1,964,968 | 7/34 | Warmisham | 88—1 |
| 2,729,138 | 1/56 | Bernier | 352—60 |
| 2,967,453 | 1/61 | Wells | 352—71 |

FOREIGN PATENTS 505,908   12/54   Italy.

JULIA E. COINER, *Primary Examiner.*